(12) United States Patent
Imaki et al.

(10) Patent No.: US 10,341,516 B2
(45) Date of Patent: Jul. 2, 2019

(54) ROTATION DRIVE DEVICE, IMAGE READING DEVICE, AND IMAGE FORMING APPARATUS

(71) Applicants: Daisuke Imaki, Tokyo (JP); Yohei Osanai, Kanagawa (JP); Genta Hagiwara, Kanagawa (JP); Masatoshi Ishida, Kanagawa (JP); Tatsuaki Nagano, Kanagawa (JP); Satoshi Narai, Kanagawa (JP); Toshiyuki Horikawa, Kanagawa (JP); Yasunobu Youda, Kanagawa (JP); Takayuki Andoh, Kanagawa (JP); Kaoru Tada, Kanagawa (JP)

(72) Inventors: Daisuke Imaki, Tokyo (JP); Yohei Osanai, Kanagawa (JP); Genta Hagiwara, Kanagawa (JP); Masatoshi Ishida, Kanagawa (JP); Tatsuaki Nagano, Kanagawa (JP); Satoshi Narai, Kanagawa (JP); Toshiyuki Horikawa, Kanagawa (JP); Yasunobu Youda, Kanagawa (JP); Takayuki Andoh, Kanagawa (JP); Kaoru Tada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/919,643

(22) Filed: Mar. 13, 2018

(65) Prior Publication Data
US 2018/0270375 A1 Sep. 20, 2018

(30) Foreign Application Priority Data
Mar. 15, 2017 (JP) .................................. 2017-049884

(51) Int. Cl.
*H04N 1/00* (2006.01)
*G03G 15/00* (2006.01)
(Continued)

(52) U.S. Cl.
CPC ....... *H04N 1/00602* (2013.01); *B65H 3/0638* (2013.01); *B65H 3/0669* (2013.01);
(Continued)

(58) Field of Classification Search
USPC .......................................................... 358/498
See application file for complete search history.

(56) References Cited

U.S. PATENT DOCUMENTS 5,206,737 A * 4/1993 Sugiyama ............ H04N 1/0057
358/296
5,954,325 A * 9/1999 Nagao .................... B65H 3/126
271/184
(Continued)

FOREIGN PATENT DOCUMENTS

| JP | 2012-123123 | 6/2012 |
|---|---|---|
| JP | 2013-173581 | 9/2013 |
| JP | 2014-003421 | 1/2014 |
| JP | 2016-225918 | 12/2016 |

*Primary Examiner* — Ngon B Nguyen
(74) *Attorney, Agent, or Firm* — Harness, Dickey & Pierce, P.L.C.

(57) ABSTRACT

A rotation drive device includes a driven rotation member, a driving rotation member, a rotation relay member, a shaft, and a holder. The rotation relay member transmits only a unidirectional rotational driving force from the driving rotation member to the driven rotation member. The rotation relay member includes a housing and a cylindrical one-way clutch. A contact portion between the driving rotation member and the shaft is configured to rotate the driving rotation member and the shaft to transmit the driving force to an inner peripheral side of the cylindrical one-way clutch via the shaft. The driving rotation member includes a boss projected toward the holder and rotatably held in the holder.

(Continued)

A portion of the shaft to support the driving rotation member and an inner wall surface of a through hole of the driving rotation member are shaped to rotate the shaft and the driving rotation member. together.

6 Claims, 7 Drawing Sheets

(51) Int. Cl.
   *B65H 5/06* (2006.01)
   *B65H 3/06* (2006.01)
(52) U.S. Cl.
   CPC .............. *B65H 3/0684* (2013.01); *B65H 5/06* (2013.01); *G03G 15/602* (2013.01); *H04N 1/00588* (2013.01); *B65H 2403/42* (2013.01); *B65H 2403/72* (2013.01); *B65H 2404/134* (2013.01); *B65H 2404/1351* (2013.01); *B65H 2801/06* (2013.01); *B65H 2801/39* (2013.01); *G03G 2221/1657* (2013.01)

(56) References Cited

U.S. PATENT DOCUMENTS

| | | | |
|---|---|---|---|
| 2006/0220300 A1* | 10/2006 | Nakakita | B65H 3/063 271/121 |
| 2010/0072691 A1* | 3/2010 | Ueda | B65H 3/0607 271/110 |
| 2013/0222826 A1 | 8/2013 | Osanai et al. | |
| 2013/0335790 A1 | 12/2013 | Narai et al. | |
| 2014/0374212 A1* | 12/2014 | Tamura | F16D 41/00 192/41 R |
| 2016/0127590 A1 | 5/2016 | Hatayama et al. | |
| 2016/0277624 A1 | 9/2016 | Osanai et al. | |
| 2016/0360073 A1 | 12/2016 | Hatayama et al. | |
| 2016/0368728 A1 | 12/2016 | Hirata et al. | |
| 2017/0134598 A1 | 5/2017 | Nagano et al. | |
| 2017/0142265 A1 | 5/2017 | Horikawa et al. | |
| 2017/0142271 A1 | 5/2017 | Kawai et al. | |
| 2017/0180603 A1 | 6/2017 | Hatayama et al. | |
| 2017/0183181 A1 | 6/2017 | Tada et al. | |
| 2017/0331970 A1 | 11/2017 | Osanai et al. | |
| 2017/0351209 A1 | 12/2017 | Nagano et al. | |

* cited by examiner

ROTATION DRIVE DEVICE, IMAGE READING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2017-049884, filed on Mar. 15, 2017, in the Japan Patent Office, the entire disclosure of which is hereby incorporated by reference herein.

BACKGROUND

Technical Field

Aspects of the present disclosure relate to a rotation drive device, an image reading device, and an image forming apparatus.

Related Art

A rotation drive device has been known that includes a driven rotation member, a driving rotation member to receive rotational driving forces from a driving source, and a rotation relay member to transmit only a unidirectional rotational driving force of the rotational driving forces of the driving rotation member to the driven rotation member.

SUMMARY

In an aspect of the present disclosure, there is provided a rotation drive device that includes a driven rotation member, a driving rotation member, a rotation relay member, a shaft, and a holder. The driving rotation member receives rotational driving force from a driving source. The rotation relay member transmits only a unidirectional rotational driving force from the rotational driving force of the driving rotation member to the driven rotation member. The holder holds the driving rotation member. The driven rotation member, the rotation relay member, and the driving rotation member have through holes including center axis lines of the driven rotation member, the rotation relay member, and the driving rotation member. The shaft passes through the through holes. The rotation relay member includes a housing rotatable with the driven rotation member and a cylindrical one-way clutch disposed at an inner peripheral side of the housing. A contact portion between the driving rotation member and the shaft is configured to rotate the driving rotation member and the shaft in conjunction with each other to transmit the rotational driving force of the driving rotation member to an inner peripheral side of the cylindrical one-way clutch via the shaft. The driving rotation member includes a boss that is projected toward the holder and is rotatably held in a supporting hole of the holder. A portion of the shaft to support the driving rotation member and an inner wall surface of the through hole of the driving rotation member are shaped to rotate the shaft and the driving rotation member together.

In another aspect of the present disclosure, there is provided an image reading device that includes a loading portion, a sheet feeding roller, a conveying roller, an image reader, and the above-described rotation drive device. The loading portion loads a sheet having an image to be read. The sheet feeding roller feeds the sheet loaded on the loading portion. The conveying roller conveys the sheet fed by the sheet feeding roller. The image reader reads the image of the sheet conveyed by the conveying roller. The rotation drive device rotates and drives the sheet feeding roller.

In still another aspect of the present disclosure, there is provided an image forming apparatus that includes a loading portion, a sheet feeding roller, a conveying roller, an image reader, an image forming unit, and the above-described rotation drive device. The loading portion loads a sheet having an image to be read. The sheet feeding roller feeds the sheet loaded on the loading portion. The conveying roller conveys the sheet fed by the sheet feeding roller. The image reader reads the image of the sheet conveyed by the conveying roller. The image forming unit forms an image on a recording medium based on the image read by the image reader. The rotation drive device rotates and drives the sheet feeding roller.

In still yet another aspect of the present disclosure, there is provided an image forming apparatus that includes a loading portion, a sheet feeding roller, a conveying roller, an image forming unit, and the above-described rotation drive device. The loading portion loads a recording sheet on which an image is formed. The sheet feeding roller feeds the recording sheet loaded on the loading portion. The conveying roller conveys the recording sheet fed by the sheet feeding roller. The image forming unit forms the image on the recording sheet conveyed by the conveying roller. The rotation drive device rotates and drives the sheet feeding roller.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
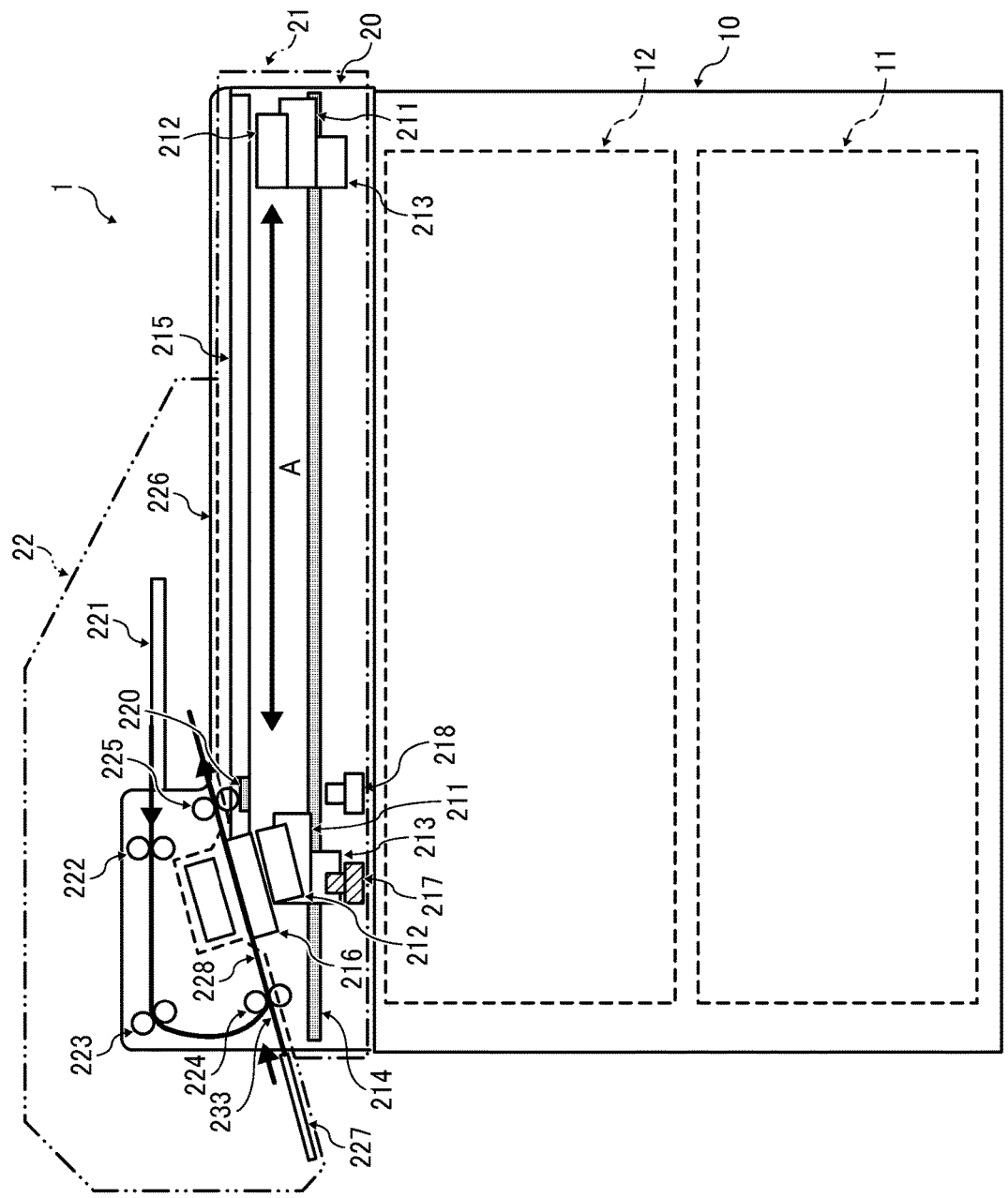
FIG. 1 is an explanatory diagram of an exemplary schematic arrangement in an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results. Although the embodiments are described with technical limitations with reference to the attached drawings, such description is not intended to limit the scope of the disclosure and all of the components or elements described in the embodiments of this disclosure are not necessarily indispensable. As used herein, the singular forms "a", "an" and "the" are intended to include the plural forms as well, unless the context clearly indicates otherwise.

Referring now to the drawings, embodiments of the present disclosure are described below. In the drawings for explaining the following embodiments, the same reference codes are allocated to elements (members or components) having the same function or shape and redundant descriptions thereof are omitted below.

An embodiment is described below referring to the drawings. FIG. 1 is an explanatory diagram of an exemplary schematic arrangement in an image forming apparatus 1 according to the present embodiment. As illustrated in FIG. 1, the image forming apparatus 1 according to the present embodiment is an exemplary copying machine including an apparatus body 10 and an image reading device 20 to read an image of a document. The apparatus body 10 includes a sheet container 11 as a recording medium container to house sheets as a recording medium on which an image is formed and an image forming device (image formation unit) 12 as an image forming unit. The image reading device 20 includes an image reading unit 21 as an image reader and an automatic document feeder (referred to as "ADF") 22 as a document supplying device. The document includes an image read by the image reading unit 21.

The image forming device 12 includes, for example, an exposure unit as exposure means, a plurality of photoconductor drums, a developing device using toners of four colors, i.e., cyan (C), magenta (M), yellow (Y), and black (K), a transfer belt as an intermediate transfer body, a secondary transfer unit, and a fixing unit. The image forming device 12 forms an image, for example, as follows, based on a read image of the document read by the image reading device 20 or print data transmitted from an external device such as a personal computer (PC). The image forming device 12 exposes the photoconductor drum of each color by the exposure unit based on the print data to form an electrostatic latent image on each photoconductor drum and supplies the toner on the latent image on each photoconductor drum by each color developing unit of the developing device to develop the image. The image forming device 12 primarily transfers the toner image on each photoconductor drum to the transfer belt and secondarily transfers the toner image on the sheet as the recording medium by the secondary transfer unit in an overlapped manner. After that, the toner images on the sheet are heated and pressed, and fixed by the fixing unit to form a color image.

The image reading device 20 can be operated while switching a DF scanner mode (fed document reading mode) and a flat bed scanner mode (loaded document reading mode). The DF scanner mode is a mode in which an image of a document is read during automatic conveyance when the document is conveyed by the ADF 22. The flat bed scanner mode (hereinafter referred to as "FBS mode") is a mode in which an image of a document loaded on a flat bed contact glass 215 is read.

In the FBS mode, the image reading unit 21 can read a document image by irradiating an image surface of the document (for example, individual document sheet, heavy paper, book, and card) on the flat bed contact glass 215 with light and converting reflection light from the image surface into an image signal. Here, the "individual document sheet" indicates, for example, a document including one sheet with a fixed size such as A3, A4, and A5 (hereinafter referred to as "document sheet").

In the DF scanner mode, the ADF 22 separates a single document sheet from a bundle of document sheets loaded on a document tray (multi-tray) 221, which is a sheet loading member (sheet loader), by a pickup roller 222 as a sheet feeding roller and feeds the separated document sheet. The document tray 221 is disposed above a discharging tray 226 as a sheet ejecting unit to eject the document which is a sheet to be conveyed. Furthermore, the document tray 221 turns around a turn supporting member of the ADF body by a user's operation and can be in a closed state in which the document tray 221 is closed to cover the discharging tray 226 and an opened state in which the document tray 221 is opened to open the discharging tray 226.

The document sheet fed from the document tray 221 is brought in a document conveyance passage 228 as a sheet conveying passage by a feed roller 223 as a sheet conveying roller. In addition, the document sheet is conveyed along the document conveyance passage 228 by conveying rollers 224 and 225. During the conveyance, the document sheet partially faces to a DF contact glass (slit glass) 216 on the top surface side of the image reading unit 21 from the front end portion in the conveyance direction in sequence. That is, the image reading device 20 sequentially reads the image on the document sheet conveyed by the ADF 22, on the DF contact glass 216 of the image reading unit 21 so as to serve as a DF scanner. Between the flat bed contact glass 215 and the DF contact glass 216, a relay supporting member is disposed to support and relay the flat bed contact glass 215 and the DF contact glass 216. A back-side reader 219 to read the back side of the document sheet is disposed opposite to the DF contact glass 216 via the document conveyance passage 228.

The ADF 22 is attached to a rear portion of the top surface of the apparatus body 10 (portion on rear surface side in FIG. 1) via an opening/closing mechanism such as a hinge. The ADF 22 can be positioned at an opening position where the flat bed contact glass 215 is opened relative to the apparatus body 10 and a closing position where the document can be pressed against the flat bed contact glass 215.

Figure 2:
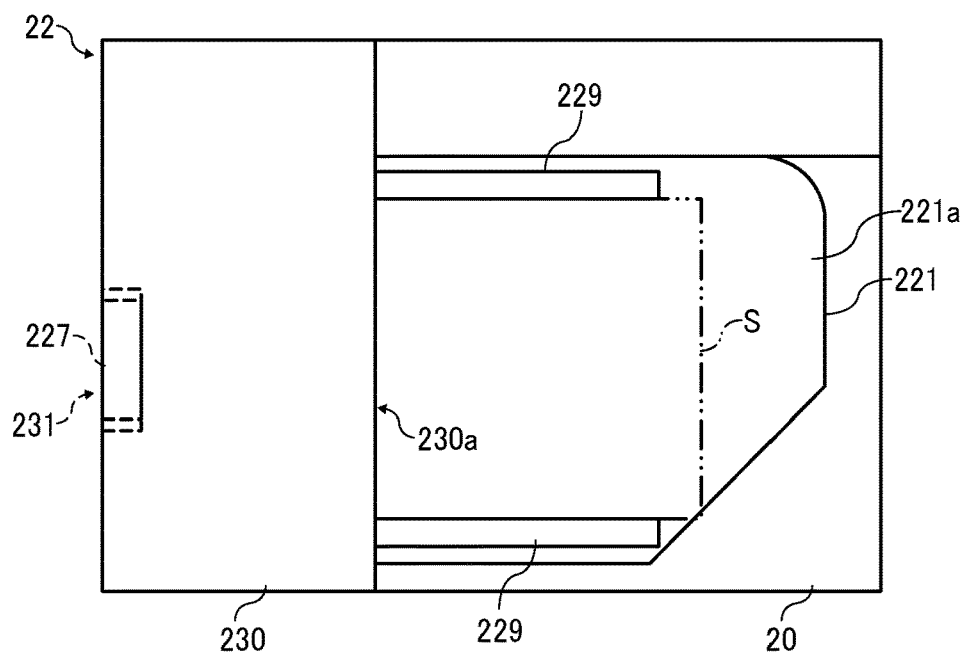
FIG. 2 is a top view of an image reading device of the image forming apparatus of FIG. 1.

FIG. 2 is a top view of the image reading device 20 according to the present embodiment. To the document tray 221, a right-and-left pair of movable side guide plates 229 which positions a document sheet S set on a document loader 221a in the width direction perpendicular to a document feeding direction (sheet conveyance direction) is attached. The side guide plates 229 are formed to relatively move close to or apart from each other so that the center of the document tray 221 in the width direction coincides with the center of the document sheet S in the width direction. The side guide plates 229 may be arranged in a state where one end of the document sheet S is brought into contact with one end of the document tray 221 and the other end can be moved.

The ADF 22 is covered with a cover 230. At least an upper side of the cover 230 can be opened and closed. In the cover 230, a sheet feed opening 230a is formed above a place near the sheet-feeding end of the document tray 221 so that the leading end of the document sheet S enters the cover 230. The cover 230 covers above the leading end portion of the document tray 221 in the conveyance direction so that the leading end portion of the document tray 221 is housed to the inner side of the sheet feed opening 230a. Furthermore, in the ADF 22, a principal guide portion forming a conveyance path of the document conveyance passage 228 from the sheet feed opening 230a to a sheet ejection opening is formed by a rib on the cover 230 and the like.

As illustrated in FIG. 1, when the document such as the document sheet S to be read is loaded in a case where the image reading device 20 functions as a flat bed scanner (FBS), the flat bed contact glass 215 faces an image surface of the document. In a case where the image reading device 20 functions as a DF scanner, the DF contact glass 216 faces an image surface of the following special document. That is, the DF contact glass 216 faces the image surface of the document sheet S passing through a predetermined reading position of the document conveyance passage 228 or the image surface of the special document, which is not flexible, such as a small card-shaped document and a thick document to be described later. In addition, the DF contact glass 216 is inclined to form a previously set inclination angle with respect to the flat bed contact glass 215.

The image reading unit 21 includes a first reading unit including a carriage 211 and an integral optical scanning unit 212 as an image reading element for both the FBS and a guide rail (also referred to as "guide rod") 214 extending along the horizontal direction in FIG. 1. The carriage 211 of the first reading unit includes, for example, a bracket which holds the integral optical scanning unit 212 and compression coil springs as a plurality of elastic members. The compression coil spring is incorporated between the integral optical scanning unit 212 and the bracket of the carriage 211 in a compressed state. Furthermore, under the carriage 211, a detection target 213 to be detected by home position sensors 217 and 218 including a reflection or transmission type optical sensor and the like. The position detected by the home position sensor 217 of the first reading unit is a home position in the DF scanner mode, and the position detected by the home position sensor 218 is a home position in the FBS mode.

For example, the integral optical scanning unit 212 is formed as a contact image sensor to make a mold frame hold an unmagnification imaging element roof mirror lens array, an unmagnification image sensor, an illumination light source, and the like. The integral optical scanning unit 212 can line-scan an image with high resolution in the main scanning direction and has a large depth of focus with which the integral optical scanning unit 212 can read an image of a document such as a book. The main scanning direction is a direction parallel to both of the top surface of the flat bed contact glass 215 and the top surface of the DF contact glass 216. The structure of the integral optical scanning unit 212 is not limited to a specific system as long as the integral optical scanning unit 212 can use both the DF scanner and the flat bed scanner.

Above the integral optical scanning unit 212, a rectangular annular upper slider which smoothly slides and moves along the sub-scanning direction while having contact with the lower surface of at least one of the flat bed contact glass 215 and the DF contact glass 216 is attached. The upper sliders may be projections which extend along the longitudinal direction or the short direction of the integral optical scanning unit 212 and take apart from each other along a direction perpendicular to the extending direction. Furthermore, the upper slider may include a plurality of hemispherical projections. In either case, it is preferable that the upper slider include a material which has a low friction coefficient, excellent slidability and movability, and no lubrication relative to the lower surfaces of the flat bed contact glass 215 and the DF contact glass 216, or other guide surface instead of the lower surfaces.

The integral optical scanning unit 212 is guided by a guide rail 214 arranged below the bracket of the carriage 211 to be movable in the sub-scanning direction (direction of arrow A in FIG. 1). According to the position in the sub-scanning direction, the upper part of the integral optical scanning unit 212 slidably has contact with one of or both of the flat bed contact glass 215 and the DF contact glass 216. With this structure, although the first reading unit is movable along the guide rail 214, an inclination relative to the axis of the guide rail 214 is regulated.

By line-scanning the image surface of the document on the flat bed contact glass 215 in the main scanning direction and moving along the sub-scanning direction, the first reading unit can read the image of the document. By line-scanning the image of the conveyed document passing through the upper side of the DF contact glass 216 in the main scanning direction, the first reading unit can read the image of the document.

The image reading unit 21 includes an endless loop-shaped timing belt. At one position in the circumferential direction of the timing belt, the carriage 211 of the first reading unit is secured. The image reading unit 21 includes, e.g., a plurality of timing pulleys and a motor to rotate and drive any one of the timing pulleys. Around the plurality of timing pulleys, the timing belt is stretched without loosing In a case where the image reading device 20 performs a reading operation in the FBS mode, the first reading unit moves to the right side in FIG. 1 while moving from the FSB home position detected by the home position sensor 218 to one side in the sub-scanning direction. For each very short moving distance, the integral optical scanning unit 212 performs line scanning to read an image of the surface (lower surface) of the document loaded on the flat bed contact glass 215. When the reading operation ends, the first reading unit returns to the FSB home position again.

In a case where the reading operation in the DF scanner mode is performed, the first reading unit moves from the DF home position detected by the home position sensor 217 to the lower side of the DF contact glass 216. That is, the first reading unit moves a previously set distance from the DF home position to the opposite side in the sub-scanning direction and stops below the DF contact glass 216, and then reads the image on the surface of the document passing through the DF contact glass 216.

In this way, the first reading unit can move in the sub-scanning direction to be positioned at both the position below the flat bed contact glass 215 and the position below the DF contact glass 216. According to the position in the sub-scanning direction, the attitude of the integral optical scanning unit 212 is changed between a horizontal first reading attitude and a second reading attitude. At the first reading attitude, the integral optical scanning unit 212 can read an image through the flat bed contact glass 215, and at the second reading attitude, the integral optical scanning unit 212 is inclined to be capable of reading an image through the DF contact glass 216.

As described above, the ADF 22 includes the document tray 221 and the document conveyance passage 228 through which the document sheet S is conveyed in a state where the image of the document sheet S can be read. In addition, the ADF 22 includes the discharging tray 226 as an ejected sheet loading unit where the document sheet S of which the image has been read or the special document such as a card C to be described later is ejected and stacked. Immediately below the document tray 221, a space is provided where a user can take the sheet on the discharging tray 226. For miniaturization, the document tray 221 and the discharging tray 226 are vertically stacked in a state where at least a part of the trays are separated from each other.

Figure 3:
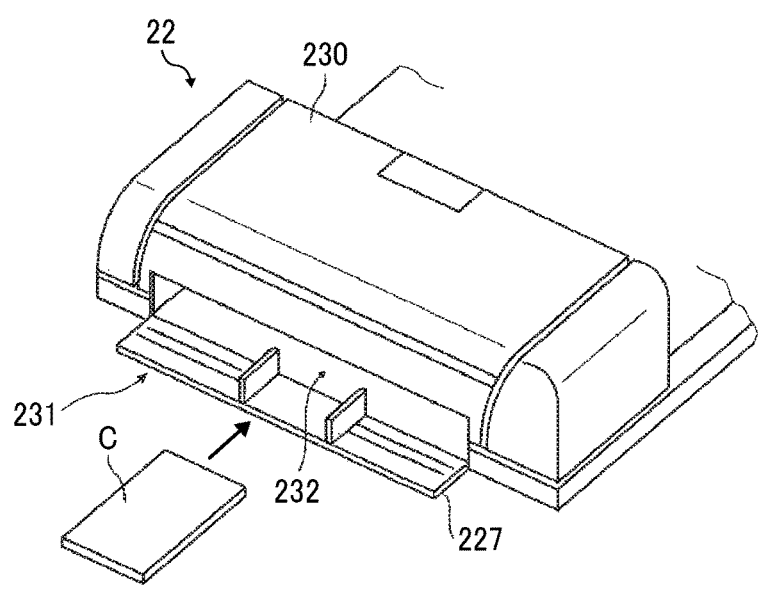
FIG. 3 is a perspective view of an automatic document feeder (ADF) of the image reading device of FIG. 2 as viewed from a side of a special document supply unit.

FIG. 3 is a perspective view of the automatic document feeder (ADF) 22 according to the present embodiment as viewed from a side of a special document supply unit 231. The special document supply unit 231 is a document supply unit which supplies the special document such as a small card-shaped document (hereinafter referred to as "card") C and a thick document. The special document such as the card C and the thick document is a document including an image to be read. The automatic document feeder (ADF) 22 according to the present embodiment can eject the special document such as the card C, supplied and conveyed from the special document supply unit 231, on the discharging tray 226.

Here, the card C may be a thick resin card such as a cash card of a bank and the like and various credit cards and a card with a standard fixed size including a resin and the like (may be heavy paper), for example, a driver's license, an identification card (ID card), and a traffic card. The "small size" indicates, for example, a size smaller than a post card, and may be a size of a card identical to or substantially same as any one of ID-1, ID-2, and ID-3 of ISO/IEC7810 which is an international standard that defines the shape of the ID card.

As illustrated in FIGS. 3 and 2 described above, the special document supply unit 231 includes the conveying roller 224, a special document supply port 232, a special document supply tray (bypass tray) 227, and a special document conveyance passage 233. Here, the conveying roller 224 functions as a pair of pickup rollers as sheet feeding rollers to feed the special document such as the card C.

As illustrated in FIG. 2, the special document supply tray 227 is normally closed and forms a part of a side surface of the cover 230, and can turn to open the special document supply port 232. Furthermore, in the closed state, the special document supply tray 227 forms a part of a conveyance guide for the document sheet S which is a normal document.

The conveying roller (pickup roller) 224 takes and feeds the special document such as the card C including the image to be read which has been set on the special document supply tray 227 and supplies the special document to the special document conveyance passage 233.

The special document conveyance passage 233 is a downwardly inclined path from the special document supply port 232 to the DF contact glass 216 without being curved and joins to the document conveyance passage 228 on the upstream side of the DF contact glass 216. At this time, the special document conveyance passage 233 is positioned on the same plane as the DF contact glass 216 along an inclination angle of the DF contact glass 216 in a range from the special document supply port 232 to the DF contact glass 216, according to the downward inclination of the DF contact glass 216.

The ADF 22 according to the present embodiment is miniaturized and shortens the reading time. Furthermore, the ADF 22 according to the present embodiment can read the image of the special document such as a small and thick resin card and can cope with diversification in document reading.

Figure 4:
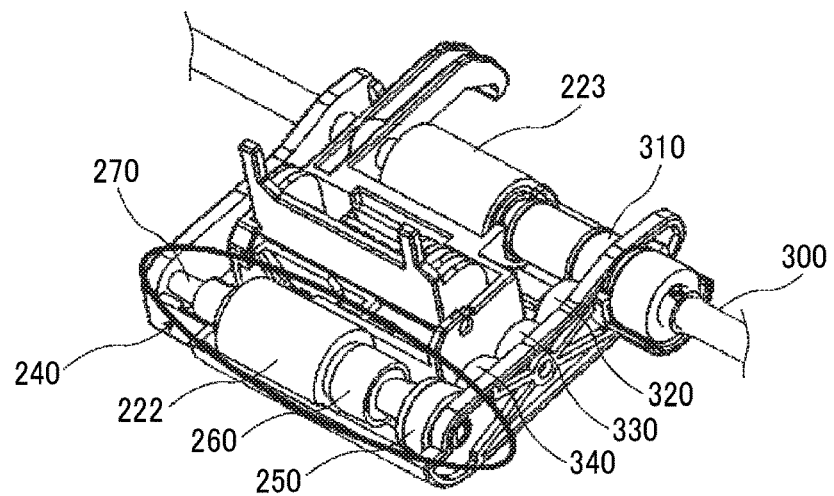
FIG. 4 is a perspective view of an example of a pickup roller, a feed roller, and a driving system of the automatic document feeder (ADF) of the image reading device of FIG. 2.
Figure 5:
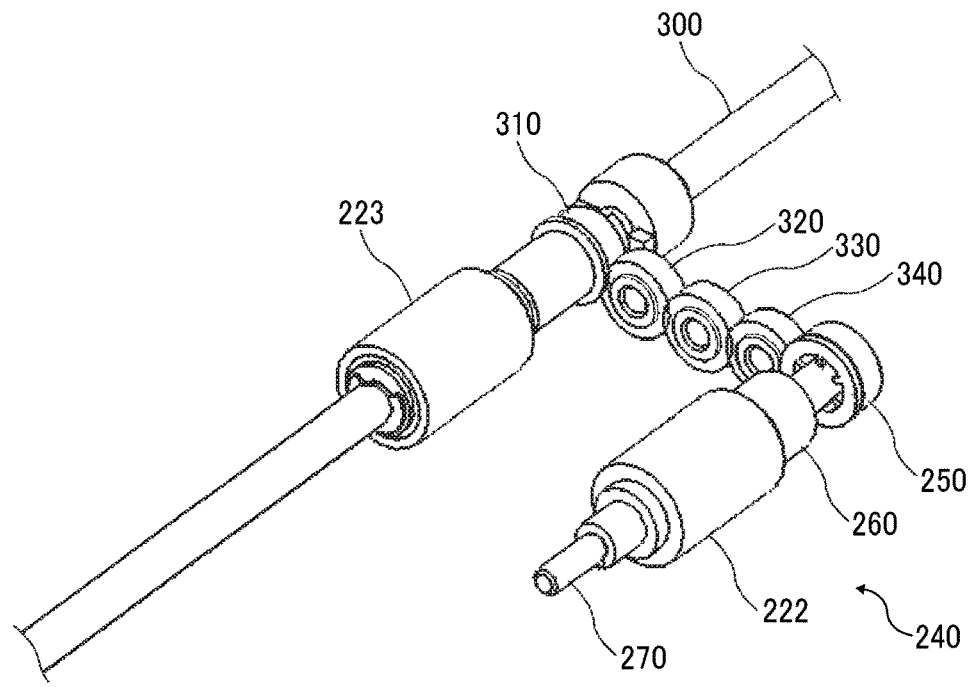
FIG. 5 is a partial perspective view of the pickup roller, the feed roller, and the driving system in FIG. 4 as viewed from another direction.
Figure 6A:
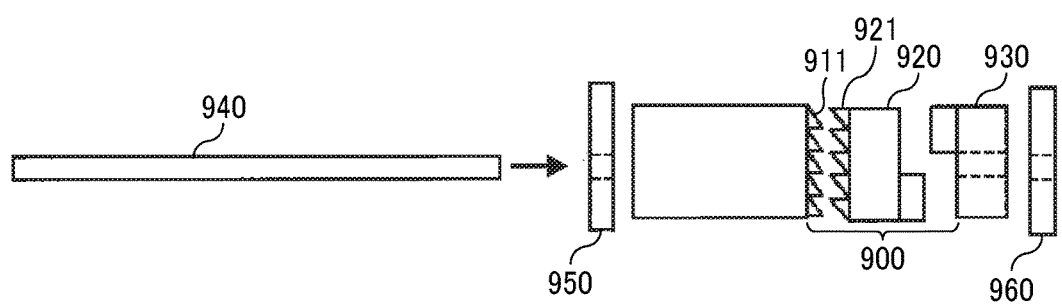
FIGS. 6A and 6B are an exploded view and an assembly view, respectively, of a rotation drive mechanism of a pickup roller according to a comparative example.
Figure 6B:
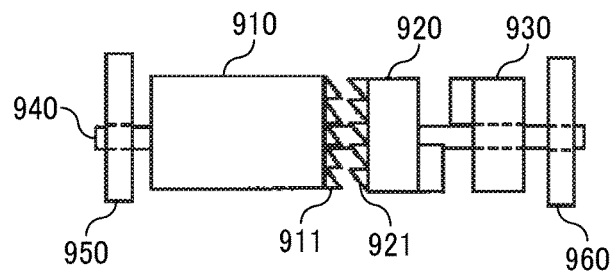

Next, a rotation drive mechanism as a rotation drive device of the automatic document feeder (ADF) 22 according to the present embodiment is described. FIG. 4 is a perspective view of an example of the pickup roller 222, the feed roller 223, and a driving system of the ADF 22 of the image reading device according to the present embodiment. FIG. 5 is a partial perspective view of the pickup roller 222, the feed roller 223, and the driving system in FIG. 4 as viewed from another direction. FIGS. 6A and 6B are partial perspective views of a supporting member at one end of a shaft 270 of the pickup roller 222 of the ADF 22 according to the present embodiment.

As described above, the pickup roller 222 is a roller which separates the document sheets S one by one from a bundle of document sheets loaded on the document tray 221 and feeds the separated document sheet S. A rotation drive mechanism 240 as a rotation drive device to rotate and drive the pickup roller 222 includes the pickup roller 222 as a driven rotation member, a gear 250 as a driving rotation member, and a rotation relay member 260.

The gear 250 receives rotational driving force from a driving source such as a motor. In the example in FIG. 4, the rotational driving force is transmitted from an output gear 310 mounted on a driving shaft 300 to transmit the rotational driving force from the motor to the feed roller 223 to the gear 250 via relay gears 320, 330, and 340 as rotation drive transmitting members.

The rotation relay member 260 transmits only a rotational driving force in one rotation direction, which is a predetermined rotation direction, of the rotational driving force of the gear 250 to the pickup roller 222. In the one rotation direction, the document sheet S is fed. The pickup roller 222 which has received the rotational driving force in the one rotation direction which is the predetermined rotation direction can feed the document sheet S toward the feed roller 223. Even when the rotational driving force in the direction reverse to the feeding direction of the document sheet S is transmitted to the gear 250 for some cause, the rotational driving force of the gear 250 is not transmitted to the pickup roller 222. Therefore, this reduces generation of errors in feeding the document sheet S.

The gear 250 of the rotation drive mechanism 240 as the rotation drive device according to the present embodiment may include a material same as materials of the output gear 310 and the relay gears 320, 330, and 340 to transmit the rotational driving force to the gear 250. In this case, occurrence of scrap of one member of the gear 250 and the output gear 310 and the relay gears 320, 330, and 340 and abnormal noise due to a difference in materials of both members can be suppressed. The pickup roller 222 may be driven by a driving source such as another motor different from the driving source of the feed roller 223 such as the motor.

The rotation drive mechanism 240 is assembled in a state where the shaft 270 sequentially passes through holes of the pickup roller 222, the rotation relay member 260, and the gear 250. The through holes contain the respective center axis lines. The rotation drive mechanism 240 as the rotation drive device according to the present embodiment is configured as described later to improve an assembling performance at the time when the shaft 270 is inserted through the through holes to assemble the rotation drive mechanism 240.

FIGS. 6A and 6B are an exploded view and an assembly view of a rotation drive mechanism as a rotation drive device of a pickup roller 910 according to a comparative example. The rotation drive mechanism according to the comparative example in FIGS. 6A and 6B includes a gear-coupled-type clutch (mechanical clutch) 900 as a rotation relay member. The clutch 900 includes a ratchet gear 911 on the side surface of the pickup roller 910 in the circumferential direction and a rotation relay member 920 having a ratchet gear 921 to be engaged with the ratchet gear 911 on the output-side side surface in the circumferential direction. In the clutch 900, by engaging the two ratchet gears, only the unidirectional rotational driving force of the rotational driving force transmitted from a driving rotation member 930 to the input side of the rotation relay member 920 is transmitted to the pickup roller 910.

However, the rotation drive mechanism according to the comparative example should be assembled by subsequently inserting a shaft 940 through respective through holes of the driving rotation member 930, the rotation relay member, and the pickup roller 910 and attaching the assembly to holders 950 and 960. Accordingly, an assembling performance is low.

Therefore, regarding the rotation drive mechanism 240 of the pickup roller 222 according to the present embodiment, it is intended to improve the assembling performance by reducing the number of members through which the shaft is inserted.

Figure 7:
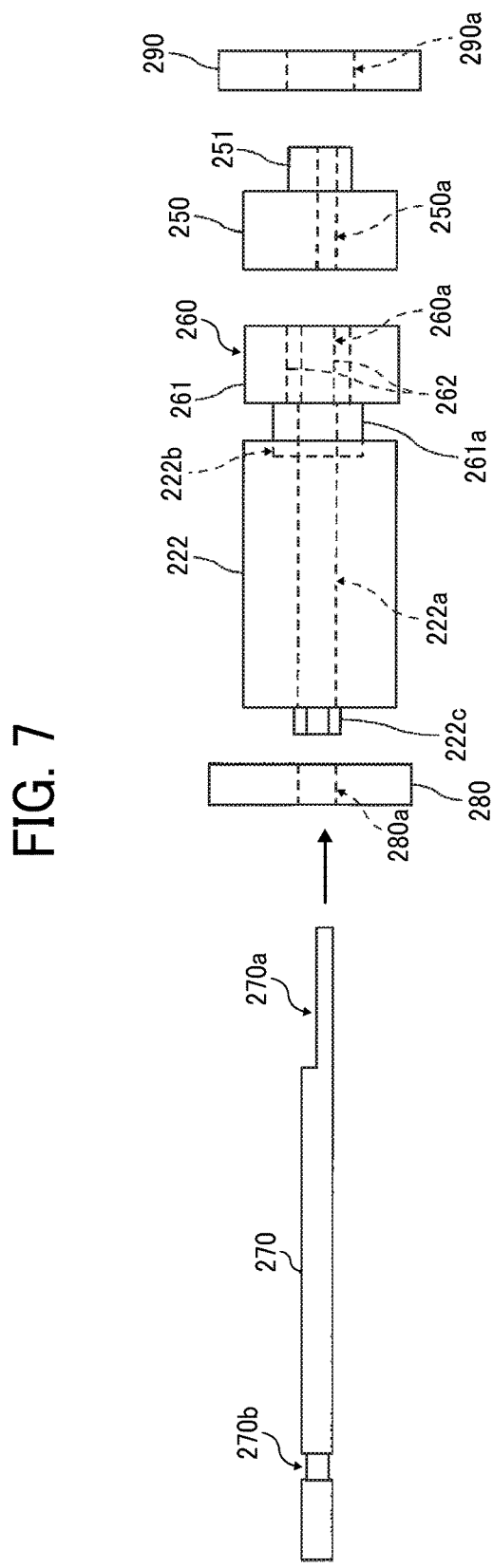
FIG. 7 is an exploded view of an example of a rotation drive mechanism of the pickup roller of the automatic document feeder (ADF) of FIG. 4.

FIG. 7 is an exploded view of an example of the rotation drive mechanism 240 as the rotation drive device of the pickup roller 222 of the ADF 22 according to the present embodiment. In the rotation drive mechanism 240 as the rotation drive device according to the present embodiment, the rotation relay member 260 includes a housing 261 and a cylindrical one-way clutch 262 press-fitted in the housing 261. The housing 261 includes a resin with high slidability (for example, polyacetal resin (polyoxyrnethylene (POM) resin)) to be integrally rotated with the gear 250. A boss 261a projected toward the pickup roller 222 of the housing 261 of the rotation relay member 260 is secured into a recess 222b in the side surface of the pickup roller 222 on the side of the gear 250.

At an end opposite to the end of the pickup roller 222 where the housing 261 of the rotation relay member 260 is secured, a claw 222c is fitted into and engaged with a recess (concave) 270b of the shaft 270 at the time of assembly. Here, the pickup roller 222 can include a synthetic component of ethylene propylene diene rubber (EPDM rubber) and a resin with high slidability (for example, polyacetal resin (POM resin)). The housing 261 of the rotation relay member 260 may be integrally formed with the pickup roller 222.

As illustrated in FIG. 7, a leading end 270a of the shaft 270 on the side of the gear to be inserted from a through hole 280a of a holder 280 to the gear 250 in a direction indicated by an arrow (that is, a portion corresponding to a through hole 250a of the gear 250 after assembly) is formed to have a cross section having a partially lacked circular shape of which a part of the circumference is lacked (D-cut shape). In addition, the through hole 250a of the gear 250 is formed to have a cross section having a partially lacked circular shape (D-cut shape) to be engaged with the partially lacked circular shaped leading end 270a of the shaft 270. In this way, by forming the partially lacked circular shaped cross sections of the leading end 270a of the shaft 270 on the side of the gear and the through hole 250a of the gear 250 to be engaged with each other, the shaft 270 and the gear 250 are integrally rotated.

To prevent the pickup roller 222 from being extracted, the recess (concave) 270b is formed in the shaft 270, and the claw 222c of the pickup roller 222 is fitted into and engaged with the recess (concave) 270b. At the time of assembly, the elastic claw 222c of the pickup roller 222 is fitted into the recess (concave) 270b of the shaft 270 so that the pickup roller 222 is not extracted.

The gear 250 includes a boss 251 projected toward a holder 290 so as to be rotatably held in a supporting hole 290a in the holder 290. Here, when the gear 250 rotates, the outer peripheral surface of the boss 251 of the gear 250 slides with respect to the inner peripheral surface of the supporting hole 290a of the holder 290. To suppress the occurrence of the scrap and the abnormal noise of the gear 250 and the holder 290 due to the sliding movement, the gear 250 and the holder 290 may include a resin. Without forming the entire gear 250 and the entire holder 290 with a resin, it is possible that at least outer peripheral portion of the boss 251 of the gear 250 includes a resin and at least an inner peripheral portion of the supporting hole 290a of the holder 290 includes a resin. By forming the components with a resin in this way, the resins slide with each other. Therefore, the occurrence of the scrap and abnormal noise is suppressed, and high durability can be obtained.

Here, the holders 280 and 290 can include, for example, resin materials having high rigidity (for example, ABS resin which is copolymer synthetic resin of acrylonitrile, butadiene, and styrene). Furthermore, the gear 250 including the boss 251 can include, for example, a material with high slidability (for example, polyacetal resin (POM resin)).

Figure 8A:
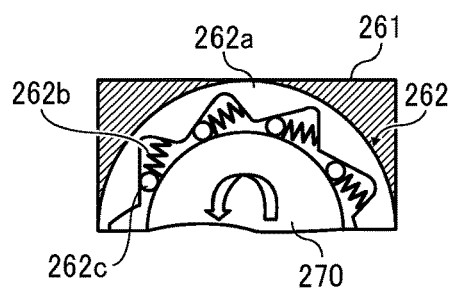
FIG. 8A is an explanatory view of an one-way clutch when being locked.
Figure 8B:
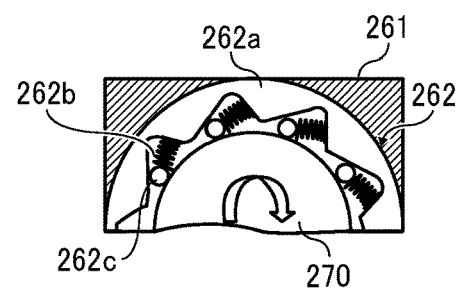
FIG. 8B is an explanatory view of the one-way clutch when idling.

FIG. 8A is an explanatory view of an one-way clutch 262 when being locked, and FIG. 8B is an explanatory view of the one-way clutch when idling. The one-way clutch 262 includes a cylindrical clutch housing 262a having a plurality of cam-shaped recesses on an inner peripheral surface in the circumferential direction and a ball 262c which is coupled to springs 262b arranged in the respective recesses of the clutch housing 262a. The shaft 270 which rotates in conjunction with the gear 250 passes through a through hole 260a containing the center axis line of the one-way clutch 262. The shaft 270 is inserted through the through hole 260a of the one-way clutch 262 while rotating the shaft 270 in an idling direction. Here, for example, the clutch housing 262a can include a resin with high slidability (for example, polyacetal resin (POM resin)), and the ball 262c can include metal. In addition, the ball 262c may be a roller.

When the one-way clutch 262 is locked (at the time of feeding document sheet) as in FIG. 8A, the shaft 270 which rotates in conjunction with the gear 250 in one predetermined rotation direction is engaged with the clutch housing 262a via the ball 262c. In this state, torque of the shaft 270 is transmitted to the clutch housing 262a via the ball 262c, and the clutch housing 262a rotates in a direction of an arrow in FIG. 8A. With this rotation, the pickup roller 222 is rotated and driven together with the housing 261 of the rotation relay member 260.

On the other hand, when the one-way clutch 262 idles as in FIG. 8B, even when the shaft 270 rotates in the direction reverse to the predetermined direction, the spring 262b contracts, and the ball 262c moves toward the clutch housing 262a. Therefore, the torque of the shaft 270 is not transmitted to the clutch housing 262a. Accordingly, the shaft 270 idles without rotating the clutch housing 262a, the housing 261 of the rotation relay member 260, and the pickup roller 222.

Figure 9A:
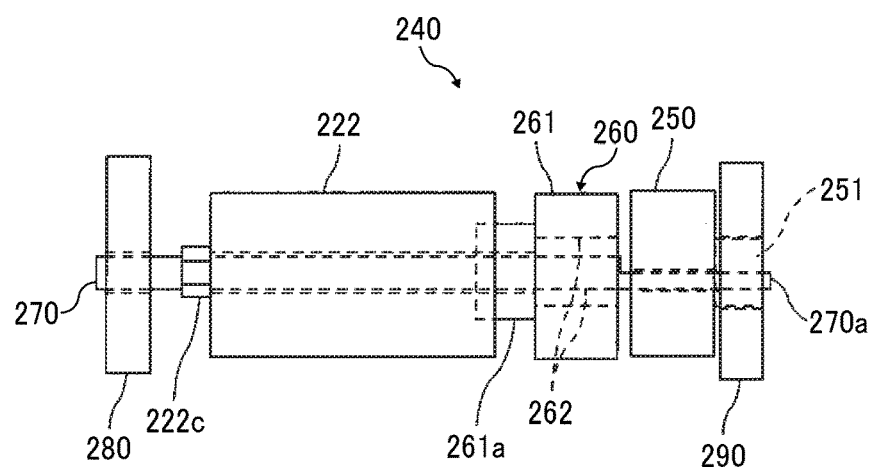
FIGS. 9A and 9B are assembly views of the rotation drive mechanism of the pickup roller of the automatic document feeder (ADF) of FIG. 4.
Figure 9B:
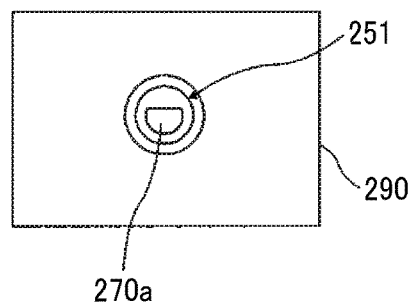
Figure 10:
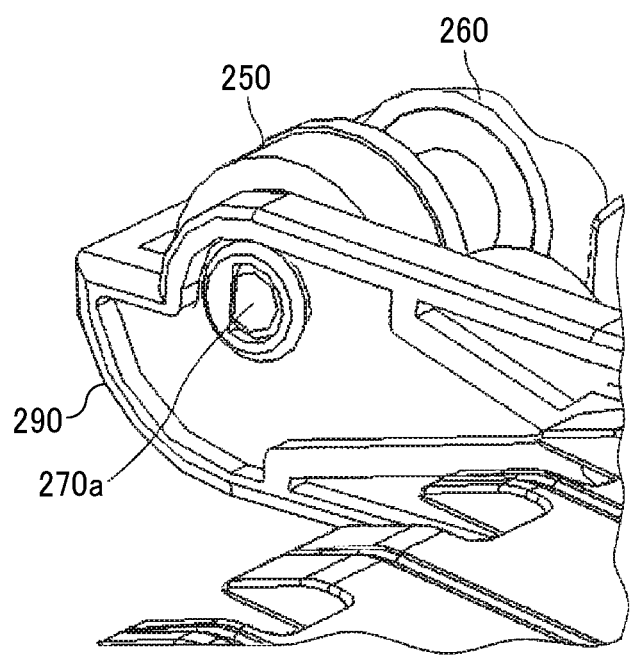
FIG. 10 is a partial perspective view of a supporting member of a shaft at one end of the pickup roller of the rotation drive mechanism after the automatic document feeder (ADF) of FIG. 4.

FIGS. 9A and 9B are assembly views of the rotation drive mechanism 240 of the pickup roller 222 of the ADF 22 according to the present embodiment. FIG. 10 is a partial perspective view of a supporting member of the shaft 270 of the assembled rotation drive mechanism 240 at one end (side of gear). The pickup roller 222, the rotation relay member 260, and the gear 250 are rotatably supported by the holders 280 and 290 with the shaft 270 passing through the through holes 222a, 260a, and 250a of the respective members in this order. As described above, the housing 261 of the rotation relay member 260 is rotatable together with the pickup roller 222, and the cylindrical one-way clutch 262 is fitted into the housing 261. Therefore, the pickup roller 222 and the rotation relay member 260 are formed as a member having an integrated structure. The rotation drive mechanism 240 can be assembled by inserting the shaft 270 through the through holes 222a and 260a of the member having the integrated structure and the through hole 250a of the gear 250. Since the rotation drive mechanism 240 can be assembled by inserting the shaft 270 through the through holes 222a and 260a of the two members, the assembling performance of the rotation drive mechanism 240 can be improved.

In the embodiment, a case where the sheet to be fed and conveyed by the pickup roller is the document of which the image is read has been described. However, the sheet to be conveyed may be a sheet other than the document. For example, the present invention can be applied to the rotation drive mechanism of the pickup roller to feed the recording medium such as a sheet-like recording sheet contained in the sheet container 11. In the embodiment, an exemplary structure in which the through hole 222a is formed in the pickup roller 222 has been described. However, it is possible that the pickup roller 222 does not have a through hole. In this case, for example, it is preferable that a boss be formed in the pickup roller 222 on the side of the holder 280 and the boss of the pickup roller 222 be rotatably held by the holder 280.

An example has been described above, and a specific effect is obtained for each of the following modes.

Aspect A

A rotation drive device, such as the rotation drive mechanism 240, includes a driven rotation member, such as the pickup roller 222, a rotation member, such as the driving gear 250, to receive rotational driving force from a driving source, such as a motor, and a rotation relay member, such as the rotation relay member 260, to transmit only a unidirectional.

rotational driving force from the rotational driving force of the driving rotation member to the driven rotation member. The rotation relay member and the driving rotation member have through holes, such as the through holes 250a and 260a, respectively, including center axis lines, through which a shaft, such as the shaft 270, passes. The through holes of the rotation relay member and the driving rotation member, respectively, include center axis lines of the rotation relay member and the driving rotation member. The rotation relay member includes a housing, such as the housing 261, rotatable together with the driven rotation member and a cylindrical one-way clutch, such as the cylindrical one-way clutch 262, disposed at an inner peripheral side of the housing. A contact portion between the driving rotation member and the shaft is formed to rotate the driving rotation member and the shaft in conjunction with each other so that the rotational driving force of the driving rotation member is transmitted to an inner peripheral side of the one-way clutch via the shaft. The driving rotation member, such as the driving gear 250, includes a boss, such as the boss 251, which is projected toward a holder, such as the holder 290, to hold the driving rotation member and is rotatably held in a supporting hole, such as the supporting hole 290a, formed in the holder. A portion of the shaft, such as the leading end 270a of the shaft 270, to support the driving rotation member and an inner wall surface of the through hole of the driving rotation member are formed so that the shaft and the driving rotation member are rotatable together. According to aspect A, as described in the above-described embodiment, since the rotation relay member and the driven rotation member are integrally formed, it is preferable that the shaft is inserted toward the through hole of the integrally formed rotation relay member at the time of assembly. Therefore, since the shaft can be more easily inserted through the integrated member at the time of assembly than a case where the shaft is inserted through two members separated from each other, the assembling performance of the rotation drive device can be improved. In addition, before the shaft is inserted through the integrally formed member and the driving rotation member, the boss of the driving rotation member can be rotatably held in the supporting hole formed in the holder in advance. Therefore, the assembling performance is further improved.

Aspect B

In the above-described aspect A, an inner peripheral surface of the supporting hole, such as the supporting hole 290a, in the holder, such as the holder 290, and an outer peripheral surface of the boss, such as the boss 251, of the driving rotation member, such as the gear 250, are slidable on each other, and the holder and the driving rotation member include a resin. Accordingly, as described in the above-described embodiment, when the driving rotation member rotates, the resin of the driving rotation member and the resin of the holder are slid on each other. Therefore, occurrence of a scrap of one member and abnormal noise due to a difference between materials of both members can be suppressed.

Aspect C

In the above-described aspects A or B, the driving rotation member, such as the gear 250, includes the same material as materials of the rotation drive transmitting members, such as the output gear 310 and the relay gears 320, 330, and 340, to transmit the rotational driving force to the driving rotation member. Accordingly, as described in the above-described embodiment, the occurrence of the scrap of one of the rotation member and the rotation drive transmitting member and the abnormal noise due to the difference between the materials of both members can be suppressed.

Aspect D

An image reading device, such as the image reading device 20, includes a loading portion, such as the document tray 221, to load a sheet, such as the document sheet S, having an image to be read, a sheet feeding roller, such as the pickup roller 222, to feed the sheet loaded on the loading portion, a conveying roller, such as the feed roller 223, to convey the sheet fed by the sheet feeding roller, and an image reader, such as the image reading unit 21, to read the image of the sheet conveyed by the conveying roller. The image reading device includes the rotation drive device in any one of the above-described aspects A to C as a rotation drive device to rotate and drive the sheet feeding roller. According to Aspect D, as described in the above-described embodiment, an assembling performance of the rotation drive device which transmits only a unidirectional rotational driving force from the rotational driving force of the driving rotation member in the image reading device to the sheet feeding roller to rotate and drive the sheet feeding roller can be improved.

Aspect E

An image forming apparatus, such as the image forming apparatus 1, includes a loading portion, such as the document tray 221, to load a sheet, such as the document sheet S, having an image to be read, a sheet feeding roller, such as the pickup roller 222, to feed the sheet loaded on the loading portion, a conveying roller, such as the feed roller 223, to convey the sheet fed by the sheet feeding roller, an image reader, such as the image reading unit 21, to read the image of the sheet conveyed by the conveying roller, and an image forming unit, such as the image forming device 12, to form an image on a recording medium, such as a sheet, based on the image read by the image reader. The image forming apparatus includes the rotation drive device in any one of the above-described aspects A to C as a rotation drive device to rotate and drive the sheet feeding roller. According to Aspect E, as described in the above-described embodiment, an assembling performance of the rotation drive device which transmits only a unidirectional rotational driving force from the rotational driving force of the driving rotation member in the image reading device of the image forming apparatus to the sheet feeding roller to rotate and drive the sheet feeding roller to rotate and drive the sheet feeding roller can be improved.

Aspect F

An image forming apparatus, such as the image forming apparatus 1, includes a loading portion, such as a paper feeding tray, to load a recording medium, such as a recording sheet of paper, on which an image is formed, a sheet feeding roller, such as a pickup roller, to feed the recording medium loaded on the loading portion, a conveying roller to convey the recording medium fed by the sheet feeding roller, and an image forming unit, such as an image forming device 12, to form an image on the recording medium conveyed by the conveying roller. The image forming apparatus includes the rotation drive device of any one of the above-described aspects A to C as a rotation drive device to rotate and drive the sheet feeding roller. With this structure, as described in the above-described embodiment, an assembling performance of the rotation drive device which transmits unidirectional rotational driving force of rotational driving force of a driving rotation member in the image forming apparatus to the sheet feeding roller to rotate and drive the sheet feeding roller can be improved.

Numerous additional modifications and variations are possible in light of the above teachings. It is therefore to be understood that, within the scope of the above teachings, embodiments of the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A rotation drive device comprising:
a driven rotation member; a driving rotation member to receive rotational driving force from a driving source;
a rotation relay member to transmit only a unidirectional rotational driving force from the rotational driving force of the driving rotation member to the driven rotation member;
a shaft; and
a holder to hold the driving rotation member,
wherein the driven rotation member, the rotation relay member, and the driving rotation member have through holes, through which the shaft passes, including center axis lines of the driven rotation member, the rotation relay member, and the driving rotation member,
wherein the rotation relay member includes:
a housing rotatable with the driven rotation member; and
a cylindrical one-way clutch disposed at an inner peripheral side of the housing,
wherein a contact portion between the driving rotation member and the shaft is configured to rotate the driving rotation member and the shaft in conjunction with each other to transmit the rotational driving force of the driving rotation member to an inner peripheral side of the cylindrical one-way clutch via the shaft,
wherein the driving rotation member includes a boss that is projected toward the holder and is rotatably held in a supporting hole of the holder, and
wherein a portion of the shaft to support the driving rotation member and an inner wall surface of the through hole of the driving rotation member are shaped to rotate the shaft and the driving rotation member together.

2. The rotation drive device according to claim 1,
wherein an inner peripheral surface of the supporting hole of the holder and an outer peripheral surface of the boss of the driving rotation member are slidable on each other, and
wherein each of the holder and the driving rotation member includes a resin.

3. The rotation drive device according to claim 1, further comprising a rotation drive transmitting member to transmit the rotational driving force to the driving rotation member,
wherein the driving rotation member includes a same material as a material of the rotation drive transmitting member.

4. An image reading device comprising:
a loading portion to load a sheet having an image to be read;
a sheet feeding roller to feed the sheet loaded on the loading portion;
a conveying roller to convey the sheet fed by the sheet feeding roller;
an image reader to read the image of the sheet conveyed by the conveying roller; and
the rotation drive device according to claim 1 to rotate and drive the sheet feeding roller.

5. An image forming apparatus comprising:
a loading portion to load a sheet having an image to be read;
a sheet feeding roller to feed the sheet loaded on the loading portion;
a conveying roller to convey the sheet fed by the sheet feeding roller;
an image reader to read the image of the sheet conveyed by the conveying roller;
an image forming unit to form an image on a recording medium based on the image read by the image reader; and the rotation drive device according to claim 1 to rotate and drive the sheet feeding roller.

6. An image forming apparatus comprising:
a loading portion to load a recording sheet on which an image is formed;
a sheet feeding roller to feed the recording sheet loaded on the loading portion;
a conveying roller to convey the recording sheet fed by the sheet feeding roller;
an image forming unit to form the image on the recording sheet conveyed by the conveying roller; and
the rotation drive device according to claim 1 to rotate and drive the sheet feeding roller.

\* \* \* \* \*